United States Patent
Hanley et al.

(10) Patent No.: US 10,498,843 B2
(45) Date of Patent: Dec. 3, 2019

(54) TOOL FOR PROVIDING ACTIONABLE FUNCTIONALITY ON A WEBSITE

(71) Applicant: Bank of America Corporation, Charlotte, NC (US)

(72) Inventors: Ryan Hanley, Plano, TX (US); Daniel J. Serna, Irving, TX (US)

(73) Assignee: Bank of America Corporation, Charlotte, NC (US)

( * ) Notice: Subject to any disclaimer, the term of this patent is extended or adjusted under 35 U.S.C. 154(b) by 167 days.

(21) Appl. No.: 15/370,779

(22) Filed: Dec. 6, 2016

(65) Prior Publication Data
US 2018/0157627 A1 Jun. 7, 2018

(51) Int. Cl.
  G06F 17/30 (2006.01)
  H04L 29/08 (2006.01)

(52) U.S. Cl.
  CPC .............. H04L 67/22 (2013.01); H04L 67/26 (2013.01); *H04L 67/02* (2013.01)

(58) Field of Classification Search
  CPC ......... H04L 67/22; H04L 67/26; H04L 67/02; G06F 17/30896
  See application file for complete search history.

(56) References Cited

U.S. PATENT DOCUMENTS

| | | | | |
|---|---|---|---|---|
| 2012/0084793 A1* | 4/2012 | Reeves | ............... | H04L 67/1095 719/313 |
| 2014/0040069 A1* | 2/2014 | Tomasofsky | ........... | G06Q 30/06 705/26.8 |
| 2016/0062555 A1* | 3/2016 | Ward | .................... | G06F 3/0481 715/778 |

OTHER PUBLICATIONS

"Ng-Book, The Complete Book on AngularJS" by Ari Lerner copyright Dec. 29, 2013 Ari Lerner.*
Toastr by CodeSeven, Toastr, Simple javascript toast notifications, http://codeseven.github.io/toastr/ (2 pages).
The MIT License/Open Source Initiative, Open Source Initiataive(/ ), https://opensource.org/licenses/mit-license.php (1 page).
The world's leading software development platform—GitHub, Built for Developers, https://github.com/ (7 pages).

* cited by examiner

*Primary Examiner* — Stephen S Hong
*Assistant Examiner* — Hope C Sheffield
(74) *Attorney, Agent, or Firm* — Michael A. Springs (57) ABSTRACT

An actionable functionality simulation tool includes an HTML module and a controller module. The HTML module includes a first directive that has a value tied to a first model property. The first directive is configured to show or hide an actionable popup on a webpage. The HTML module also includes a second directive that is configured to bind an actionable button of the actionable popup to a particular action to be performed. The controller module includes a first function call configured to set the value of the first model property to true in order to toggle the display of the actionable popup on the webpage. The controller module also includes a second function call configured to bind logic to the particular action of the second directive.

16 Claims, 4 Drawing Sheets

CONTROLLER MODULE

```
(function ( ) {
        'use strict';

angular
                .module('app')
                .controller('ConfirmationBoxController', ConfirmationBoxController);

function ConfirmationBoxController( ) {
                /* jshint validthis:true */
                var self = this;

//bindable model properties
                self.showConfirmationBox = false;         } 210

//bindable function calls
                self.displayConfirmationBox = displayConfirmationBox;
                self.performAction = performAction;
                self.cancelAction = cancelAction;

function displayConfirmationBox( ) {
                        self.showConfirmationBox = true;   } 220A
                } function performAction( ) {
                        alert("Perform the action.");
                        self.showConfirmationBox = false;  } 220B
                } function cancelAction( ) {
                        self.showConfirmationBox = false;  } 220C
                }
        }
})( );
```

FIG. 2

HTML MODULE

```
<div ng-app="app">
    <div ng-controller="ConfirmationBoxController as confirmationBoxCtrl">
        <div>
            <button type="button" ng-click="confirmationBoxCtrl.displayConfirmationBox();">Show Confirmation Box</button>
        </div>
        <div id="toast-containercustom" class="toast-top-right" aria-live="polite" role="alert"> ~310A
            ng-show="confirmationBoxCtrl.showConfirmationBox"> ~320A
            <div class="toast toast-info" style="display: block;">
                <div class="toast-message">
                    <span>Do you want to perform this action?</span>
                    <button class="btn btn-default margin2" type="button"
                        ng-click="confirmationBoxCtrl.performAction()">Ok</button> ~310B
                    <button class="btn btn-default" type="button"
                        ng-click="confirmationBoxCtrl.cancelAction()">Cancel</button> ~310C
                </div>
            </div>
        </div>
    </div>
</div>
```

TOOL FOR PROVIDING ACTIONABLE FUNCTIONALITY ON A WEBSITE

TECHNICAL FIELD

This disclosure relates generally to website functionality and more particularly to a tool for providing actionable functionality on a website.

BACKGROUND

Website functionality may be provided by various different software packages. For example, functionality to provide popup messages on a website may be provided by a particular software package that is written specifically for that function. Not all software packages, however, provide all the functionality needed by certain websites.

SUMMARY OF THE DISCLOSURE

According to some embodiments, an actionable functionality simulation tool includes a Toastr module, a Cascading Style Sheet (CSS) module, a Hyper Text Markup Language (HTML) module, and an AngularJS controller module. The Toastr module is configured to provide popup notifications on a webpage, but lacks support to display actionable buttons within the popup notifications. The CSS module includes a set of rules that control the styling of elements displayed on the webpage. The HTML module includes an ng-show AngularJS directive that is configured to show or hide an actionable popup. The ng-show AngularJS directive includes a value tied to a first model property. The HTML module also includes an ng-click AngularJS directive that is configured to bind an actionable button of the actionable popup to a particular action to be performed in response to selection of the actionable button. The HTML module also includes one or more pointers to the CSS module to control stylings of the actionable popup and the actionable button on the webpage to match stylings of the popup notifications of the Toastr module. The AngularJS controller module includes an expression to initially set a value of the first model property to false. The first model property is used to determine when to display and hide the actionable popup on the webpage. The AngularJS controller module also includes first and second function calls. The first function call is configured to set the value of the first model property to true in order to toggle the display of the actionable popup on the webpage. The second function call is configured to bind logic to the particular action of the ng-click AngularJS directive. The second function call is also configured to set the value of the first model property to false in order to hide the actionable popup.

Certain embodiments provide one or more technical advantages. For example, some embodiments improve functionality and efficiency of websites by providing actionable functionality (e.g., confirmation buttons) with a certain look and feel using various software packages. As another example, the efficiency and operation of computer systems (e.g., web servers) may be improved by combining functionality of various software modules to simulate actionable functionality that would otherwise require additional or dedicated software packages for that functionality. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Website functionality may be provided by various different software packages or libraries. For example, functionality to provide popup notifications on a website may be provided by a particular software package such as Toastr that is written specifically for that function. Not all software packages, however, provide all the functionality needed by certain websites. As a specific example, some software libraries such as Toastr that provide popup notifications for websites do not provide actionable functionality such as confirmation buttons. This may result in website programmers having to resort to writing or otherwise obtaining additional software to provide the missing functionality. And even if the missing functionality is added using additional software, it may not have the same look and feel of the elements displayed by the existing software packages used on the website.

To address these and other deficiencies of current website systems, embodiments of the disclosure provide an actionable functionality simulation tool that utilizes various software modules to provide actionable functionality (e.g., confirmation buttons) on a website that has the same look and feel of existing popup notifications. In a specific example, certain embodiments utilize CSS styling and AngularJS directives to simulate a Toastr "Ok/Cancel" confirmation box. The Toastr library was not designed to support confirmation box functionality and certain embodiments provide a way around this limitation. As a result, embodiments deliver improved functionality and efficiency of websites and webservers by simulating actionable functionality (e.g., confirmation buttons) using various software modules.

Figure 1:
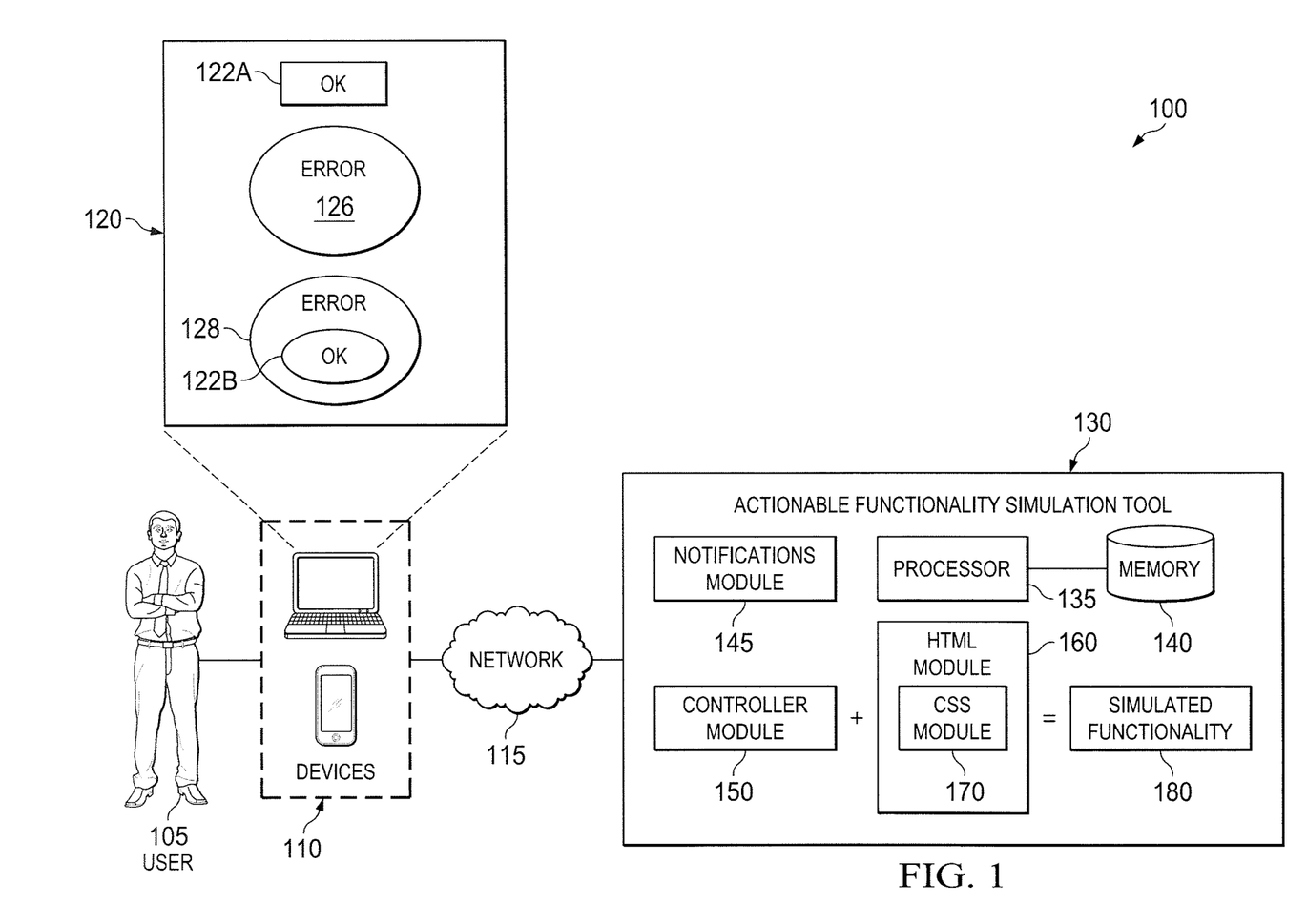
FIG. 1 illustrates a system for providing actionable functionality on a website, according to certain embodiments.
Figure 2:
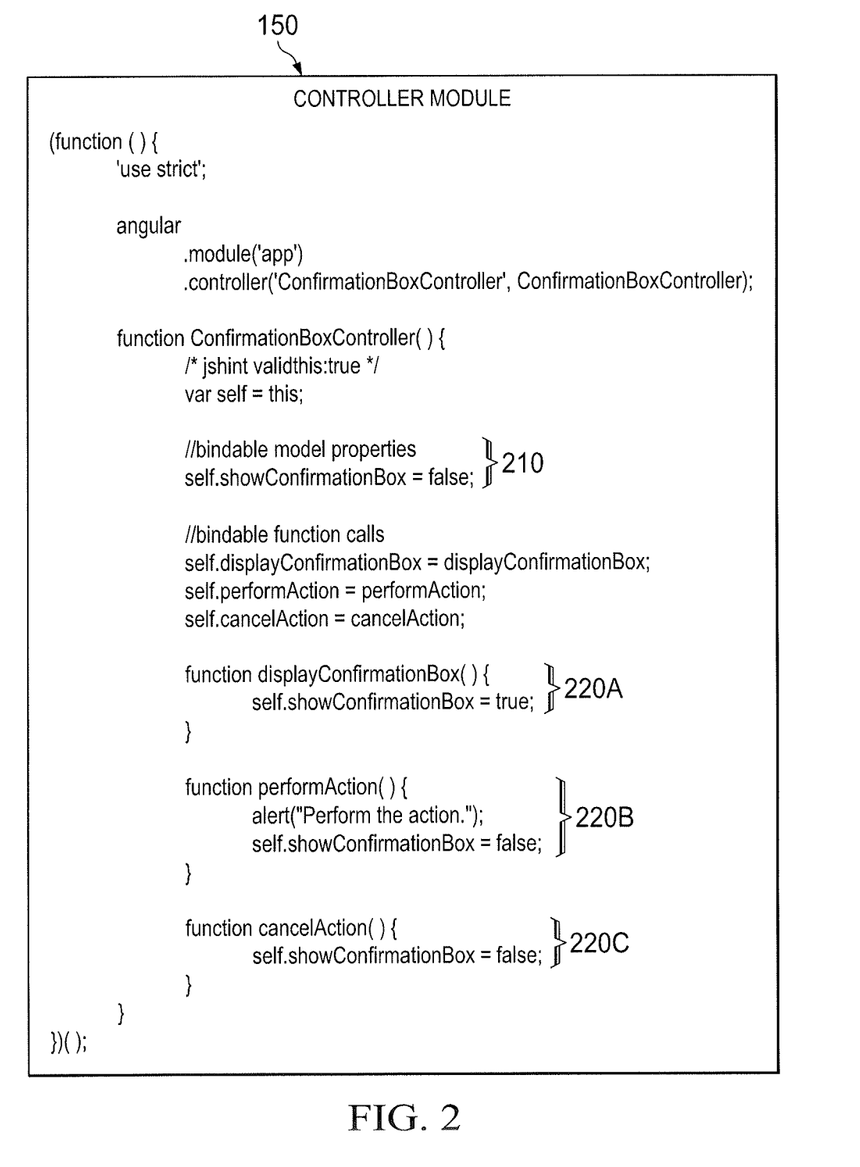
FIG. 2 illustrates the controller module of the system of FIG. 1, according to certain embodiments.
Figure 3:
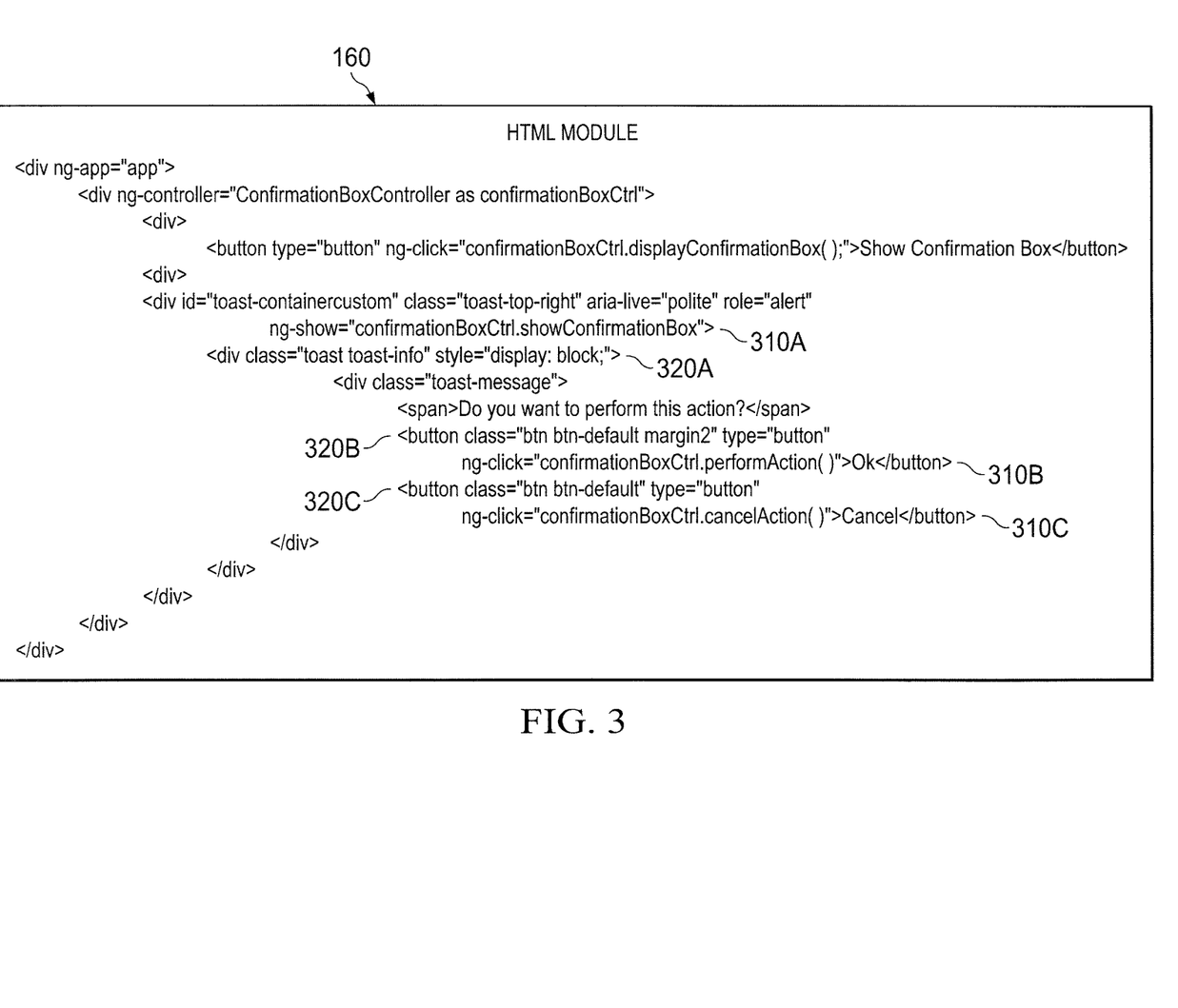
FIG. 3 illustrates the HTML module of the system of FIG. 1, according to certain embodiments.
Figure 4:
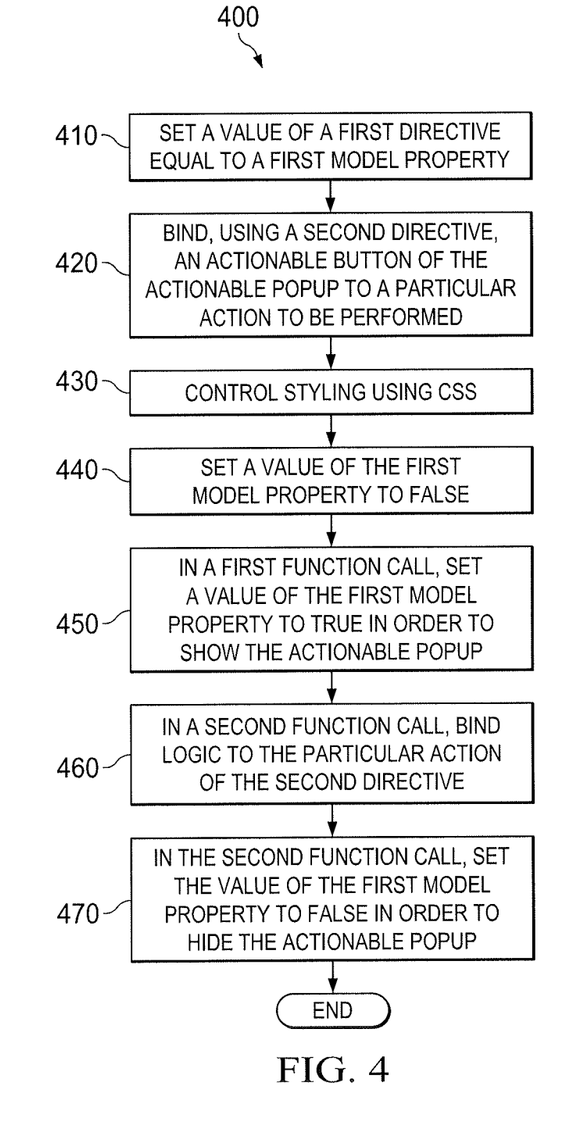
FIG. 4 is a flowchart illustrating a method for providing actionable functionality on a website using the system of FIG. 1, according to certain embodiments.

Embodiments of the actionable functionality simulation tool will be described in more detail using FIGS. 1 through 4. FIG. 1 generally illustrates a system that includes the actionable functionality simulation tool. FIG. 2 illustrates an example embodiment of the controller module of the system of FIG. 1. FIG. 3 illustrates an example embodiment of the HTML module of the system of FIG. 1. FIG. 4 illustrates an example method utilized by the actionable functionality simulation tool.

FIG. 1 illustrates a system 100 for providing actionable functionality on a website, according to certain embodiments. As illustrated in FIG. 1, system 100 includes one or more devices 110, a network 115, and actionable functionality simulation tool 130. In some embodiments, actionable functionality simulation tool 130 is communicatively coupled to devices 110 via one or more networks 115. In other embodiments, actionable functionality simulation tool 130 may be directly coupled to devices 110.

In general, actionable functionality simulation tool 130 provides actionable popups 128 on a webpage 120 that are simulated to have the appearance of popup notifications 126. Popup notifications 126, which may be provided by a software library such as Toastr, lack the ability to display an actionable button 122 (e.g., 122A-B such as an "Ok/Cancel" confirmation button). Actionable popups 128 provided by actionable functionality simulation tool 130, however, may include one or more actionable buttons 122 that perform any appropriate action when selected. For example, one actionable button 122 may be an "Ok" button and another actionable button 122 may be a "Cancel" button. In addition, actionable functionality simulation tool 130 may utilize a Cascading Style Sheet (CSS) or other stylings module to force actionable popup 128 to mimic the appearance of popup notification 126. By providing actionable popups 128 that mimic the look and feel of popup notifications 126, webpage 120 may have a uniform appearance to a user 105.

Device 110 may be any appropriate device for sending and receiving communications over network 115. As an example and not by way of limitation, device 110 may be a computer, a server, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 (e.g., a web browser) may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Actionable functionality simulation tool 130 provides actionable popups 128 on webpage 120 that simulate the appearance of popup notifications 126 that are provided by another module such as notifications module 145. As illustrated in FIG. 1, actionable functionality simulation tool 130 includes a processor 135 and a memory 140. This disclosure contemplates processor 135 and memory 140 being configured to perform any of the tasks of actionable functionality simulation tool 130 described herein.

Processor 135 is any electronic circuitry, including, but not limited to microprocessors, application specific integrated circuits (ASIC), application specific instruction set processor (ASIP), and/or state machines, that communicatively couples to memory 140 and controls the operation of actionable functionality simulation tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of actionable functionality simulation tool 130 by processing information received from network 115, device(s) 110, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135 (e.g., controller module 150, HTML module 160, and styling module 170). Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage. For example, the software may be embodied in memory 140, a disk, a CD, or a flash drive. In particular embodiments, the software may include an application executable by processor 135 to perform one or more of the functions described herein.

In some embodiments, actionable functionality simulation tool 130 may include a notifications module 145. Notifications module 145 may be any software module/library that provides popup notifications 126 on webpage 120. In some embodiments, for example, notifications module 145 may be a Toastr library that lacks support to display actionable buttons 122 within popup notifications 126. In some embodiments, popup notifications 126 may have a specific appearance when displayed on webpage 120. For example, popup notifications 126 may have a specific color, font, shape, shading, etc. when displayed on webpage 120. In some embodiments, the appearances of popup notifications 126 and other elements displayed on webpage 120 are controlled by styling module 170, as described in more detail below.

In some embodiments, actionable functionality simulation tool 130 includes a controller module 150. Controller module 150 may be, for example, an AngularJS controller module. In general, certain embodiments of controller module 150 expose an AngularJS controller model property that is used to determine when to show and hide actionable popup 128. In addition, controller module 150 may toggle the display of actionable popup 128 and bind for the actionable functionality (e.g., "Ok" and "Cancel"). A specific example of controller module 150 is illustrated in FIG. 2 and discussed in more detail below.

FIG. 2 illustrates an example embodiment of controller module 150. Controller module 150 includes a set of rules that may include a model property 210 and one or more function calls 220 (e.g., 220A-C). In general, model property 210 is used to determine when to display and hide actionable popup 128 on webpage 120. In this example, model property 210 of "showConfirmationBox" is initially set to "false" in order to hide actionable popup 128.

Function calls 220 of controller module 150 generally bind logic to directives 310 of HTML module 160 and set the value of model property 210 to "true" or "false" in order to show or hide actionable popup 128. As an example, a first function call 220A may set the value of model property 210 to "true" in order to toggle the display of actionable popup 128 on webpage 120. A second function call 220B may bind logic to a particular action of a directive 310 of controller module 150 (e.g., "Ok" button of directive 310B) and may set the value of model property 210 to "false" in order to hide actionable popup 128 on webpage 120 after the action is performed. In some embodiments, controller module 150 may include any number of additional function calls 220 according to how many actionable buttons 122 are desired within actionable popup 128. For example, controller module 150 may include a third function call 220C that binds logic to a particular action of another directive 310 of controller module 150 (e.g., "Cancel" button of directive 310C) and may set the value of model property 210 to "false" in order to hide actionable popup 128 on webpage 120 after the action is performed.

In some embodiments, actionable functionality simulation tool 130 includes an HTML module 160. HTML module 160 may be any appropriate set of rules/instructions that may be utilized by a web browser to display webpage 120. A specific example of HTML module 160 is illustrated in FIG. 3 and discussed in more detail below.

FIG. 3 illustrates an example embodiment of HTML module 160. HTML module 160 may include directives 310 (e.g., 310A-C) and pointers 320 (e.g., 320A-C). In some embodiments, directives 310 are AngularJS directives "ng-show" and "ng-click." For example, directive 310A may be an "ng-show" AngularJS directive that is configured to show or hide actionable popup 128 and may have a value that is tied to model property 210 (e.g., "showConfirmationBox"). Directive 310B may be an "ng-click" AngularJS directive that is configured to bind an actionable button 122 (e.g., "Ok" or "Cancel") of actionable popup 128 to a particular action to be performed in response to selection of the actionable button 122. Pointers 320 may reference styling module 170 in order to control the stylings of actionable popup 128 and the actionable button 122 on webpage 120 in order to match the stylings of popup notification 126 of notifications module 145. For example, pointer 320A may control the appearance of the background of actionable popup 128, pointer 320B may control the appearance of the "Ok" actionable button 122 of directive 310B, and pointer 320C may control the appearance of the "Cancel" actionable button 122 of directive 310C.

In some embodiments, actionable functionality simulation tool 130 includes a styling module 170. In some embodiments, styling module 170 is a CSS module. In general, styling module 170 contains a set of rules/instructions to control the appearances of elements that are displayed on webpage 120. For example, styling module 170 may control the colors, fonts, etc. of webpage 120. Styling module 170 may be a stand alone module or may be included within another module such as HTML module 160.

Simulated functionality 180 is any functionality that is provided by actionable functionality simulation tool 130. For example, simulated functionality 180 may be actionable popup 128 that includes one or more actionable buttons 122. In general, simulated functionality 180 may be any functionality that mimics or simulates the appearance of other elements on webpage 120 such as popup notifications 126.

In operation, actionable functionality simulation tool 130 provides simulated functionality 180 by utilizing controller module 150, HTML module 160, and styling module 170. In some embodiments, simulated functionality 180 is a simulated Toastr "Ok/Cancel" confirmation box that is provided by actionable functionality simulation tool 130 using CSS stylings of styling module 170 and AngularJS directives of controller module 150 and HTML module 160. By using the AngularJS directives 310 of "ng-show" and "ng-click," actionable functionality simulation tool 130 is able to achieve actionable functionality (e.g., confirmation box functionality). Actionable functionality simulation tool 130 exposes an AngularJS controller model property 210 that is used to determine when to show and hide actionable popup 128. Actionable functionality simulation tool 130 also uses function calls 220 and directives 310 to toggle the display of actionable popup 128 on webpage 120 and to bind for the actionable functionality (e.g., "Ok" and "Cancel" functionality). As a result, embodiments deliver improved functionality and efficiency of websites and webservers by simulating actionable functionality (e.g., confirmation buttons) using various software modules.

FIG. 4 is a flowchart illustrating a method 400 for providing actionable functionality on a website using the system of FIG. 1. In certain embodiments, actionable functionality simulation tool 130 performs method 400. By performing method 400, actionable functionality simulation tool 130 utilizes various software modules to provide actionable functionality (e.g., confirmation buttons) on a website that has the same look and feel of existing popup notifications.

Method 400 may begin in step 410 where a value of a first directive is set to be equal to a first model property. In some embodiments, the first directive is directive 310A as shown in FIG. 3 and may be the "ng-show" AngularJS directive. In some embodiments, the first model property is model property 210 as shown in FIG. 2. In some embodiments, the first directive is configured to show or hide an actionable popup such as actionable popup 128 on a webpage such as webpage 120.

At step 420, an actionable button of an actionable popup is bound, using a second directive, to a particular action to be performed in response to selection of the actionable button. In some embodiments, the second directive is directive 310B as shown in FIG. 3 and may be the "ng-show" AngularJS directive. In some embodiments, the actionable button is actionable button 122.

At step 430, the stylings of the actionable popup and the actionable button on the webpage are controlled using one or more pointers to a styling module. In some embodiments, the one or more pointers are pointers 320 as illustrated in FIG. 3. In some embodiments, the styling module is styling module 170 and may be a CSS module. In some embodiments, the stylings may include the color, text, shape, font, etc., of the actionable popup and the actionable button. In some embodiments, the stylings of the actionable popup and the actionable button on the webpage are configured to match stylings of popup notifications (e.g., popup notification 126) of a notifications module such as notifications module 145 (e.g., a Toastr library).

At step 440, a value of the first model property is initially set to "false" in order to hide actionable popup 128. In some embodiments, the first model property is model property 210 and is used to determine when to display and hide the actionable popup on the webpage. In some embodiments, the first model property is initially set to "false" in a controller module such as controller module 150 (e.g., an AngularJS controller module).

At step 450, the value of the first model property is set in a first function call to "true" in order to toggle the display of the actionable popup on the webpage. In some embodiments, the first function call is function call 220A as illustrated in FIG. 2.

At step 460, method 400 binds logic to the particular action of the second directive in a second function call. In some embodiments, the second function call of this step is function call 220B as illustrated in FIG. 2. In some embodiments, the second directive is directive 310B as illustrated in FIG. 3.

At step 470, the value of the first model property is set to "false" in the second function call in order to hide the actionable popup. In some embodiments, the second function call of this step is function call 220B as illustrated in FIG. 2. After step 470, some embodiments of method 400 may end.

In some embodiments, method 400 may additionally include steps to display more actionable buttons within the actionable popup. For example, method 400 may bind logic to the particular action of a third directive in a third function call. In some embodiments, the third function call of this step is function call 220C as illustrated in FIG. 2. In some embodiments, the third directive is directive 310C as illustrated in FIG. 3. Method 400 may also set the value of the first model property to "false" in the third function call in order to hide the actionable popup.

Modifications, additions, or omissions may be made to method 400 depicted in FIG. 4. Method 400 may include more, fewer, or other steps. For example, steps may be performed in parallel or in any suitable order. While discussed as actionable functionality simulation tool 130 performing the steps of method 400, any suitable component of system 100, such as an application (e.g., web browser) running on device(s) 110, may perform one or more steps of method 400.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. One or more computer-readable non-transitory storage media embodying software, the software comprising:
   a Toastr module configured to provide a popup notification on a webpage, the popup notification comprising a color, a text, a shape, a shading, and a font, the Toastr module containing a library lacking support to display actionable buttons within the popup notification;
   a Cascading Style Sheet (CSS) module comprising a set of rules that control the styling of elements displayed on the webpage;
   a Hyper Text Markup Language (HTML) module comprising:
      an ng-show AngularJS directive that is configured to show or hide an actionable popup, the ng-show AngularJS directive comprising a value tied to a first model property;
      an ng-click AngularJS directive that is configured to bind an actionable button of the actionable popup to a particular action to be performed in response to selection of the actionable button; and
      one or more pointers to the CSS module that sets a color, a text, a shape, a shading, and a font of the actionable popup and a color, a text, a shape, a shading, and a font of the actionable button on the webpage to match the color, the text, the shape, the shading, and the font of the popup notification of the Toastr module;
   an AngularJS controller module comprising:
      an expression to initially set a value of the first model property to false, the first model property used to determine when to display and hide the actionable popup on the webpage;
      a first function call configured to set the value of the first model property to true in order to toggle the display of the actionable popup on the webpage; and
      a second function call configured to:
         bind logic to the particular action of the ng-click AngularJS directive; and
         in response to the particular action being performed on the actionable button, set the value of the first model property to false in order to hide the actionable popup.

2. The media of claim 1, wherein:
   the HTML module further comprises:
      a second ng-click AngularJS directive that is configured to bind a second actionable button of the actionable popup to a second action to be performed in response to selection of the second actionable button; and
the AngularJS controller module further comprises:
a third function call configured to:
bind logic to the particular action of the second ng-click AngularJS directive; and
set the value of the first model property to false in order to hide the actionable popup.

3. One or more computer-readable non-transitory storage media embodying software, the software comprising:
a styling module comprising a set of rules that control the styling of elements displayed on a webpage;
a notifications module configured to provide a popup notification on the webpage, the popup notification comprising a color, a text, a shading, a shape, and a font, the notification module containing a library lacking support to display actionable buttons within the popup notifications;
a Hyper Text Markup Language (HTML) module comprising:
a first directive that is configured to show or hide an actionable popup, the first directive comprising a value tied to a first model property;
a second directive that is configured to bind an actionable button of the actionable popup to a particular action to be performed in response to selection of the actionable button; and
one or more pointers to the styling module that sets a color, a text, a shading, a shape, and a font of the actionable popup and the actionable button on the webpage to match the color, the text, the shading, the shape, and the font of the popup notification; and
a controller module comprising:
an expression to initially set a value of the first model property to false, the first model property used to determine when to display and hide the actionable popup on the webpage;
a first function call configured to set the value of the first model property to true in order to toggle the display of the actionable popup on the webpage; and
a second function call configured to:
bind logic to the particular action of the second directive; and
in response to the particular action being performed on the actionable button, set the value of the first model property to false in order to hide the actionable popup.

4. The media of claim 3, wherein the notifications module is a Toastr module.

5. The media of claim 3, wherein the controller module is an AngularJS module.

6. The media of claim 3, wherein:
the first directive is an ng-show AngularJS directive; and
the second directive is an ng-click AngularJS directive.

7. The media of claim 3, wherein:
the HTML module further comprises:
a third directive that is configured to bind a second actionable button of the actionable popup to a second action to be performed in response to selection of the second actionable button; and
the controller module further comprises:
a third function call configured to bind logic to the particular action of the third directive.

8. The media of claim 7, wherein the third directive is another ng-click AngularJS directive.

9. The media of claim 7, wherein the third function call is further configured to set the value of the first model property to false in order to hide the actionable popup.

10. A method comprising:
setting, in HTML code, a value of a first directive equal to a first model property, the first directive for showing or hiding an actionable popup on a webpage;
configuring a notifications module to provide a popup notification on the webpage, the popup notification comprising a color, a text, a shading, a shape, and a font, the notifications module containing a library lacking support to display actionable buttons within the popup notification;
binding, using a second directive in the HTML code, an actionable button of the actionable popup to a particular action to be performed in response to selection of the actionable button;
accessing, using one or more pointers in the HTML code, a styling module in order to control stylings of the actionable popup and the actionable button on the webpage, the styling module comprises one or more rules to match the color, the text, the shading, the shape, and the font of the actionable popup and the actionable button to the color, the text, the shading, the shape, and the font of the popup notification;
setting, in the HTML code, a value of the first model property to false, the first model property used to determine when to display and hide the actionable popup on the webpage;
configuring, in a first function call of the HTML code, a value of the first model property to true in order to toggle the display of the actionable popup on the webpage;
binding, in a second function call of the HTML code, logic to the particular action of the second directive; and
in response to the particular action being performed on the actionable button, setting, in the second function call of the HTML code, the value of the first model property to false in order to hide the actionable popup.

11. The method of claim 10, wherein the notifications module is a Toastr module.

12. The method of claim 10, wherein the first and second function calls are located in an AngularJS controller module.

13. The method of claim 10, wherein:
the first directive is an ng-show AngularJS directive; and
the second directive is an ng-click AngularJS directive.

14. The method of claim 10, further comprising:
binding, using a third directive in the HTML code, a second actionable button of the actionable popup to a second action to be performed in response to selection of the second actionable button,
binding, in a third function call of the HTML code, logic to the particular action of the third directive.

15. The method of claim 14, wherein the third directive is another ng-click AngularJS directive.

16. The method of claim 14, further comprising:
setting, in the third function call of the HTML code, the value of the first model property to false in order to hide the actionable popup.

* * * * *

UNITED STATES PATENT AND TRADEMARK OFFICE
CERTIFICATE OF CORRECTION

| | |
|---|---|
| PATENT NO. | : 10,498,843 B2 |
| APPLICATION NO. | : 15/370779 |
| DATED | : December 3, 2019 |
| INVENTOR(S) | : Ryan Hanley et al. |

It is certified that error appears in the above-identified patent and that said Letters Patent is hereby corrected as shown below:

In the Claims

In Column 10, Line 54, after, "...actionable..." please delete "button," and insert --button; and-- therefor.

Signed and Sealed this
Thirty-first Day of May, 2022

Katherine Kelly Vidal
*Director of the United States Patent and Trademark Office*